March 10, 1953 F. E. PALMER 2,631,048
ROTARY JOINT
Filed April 15, 1949
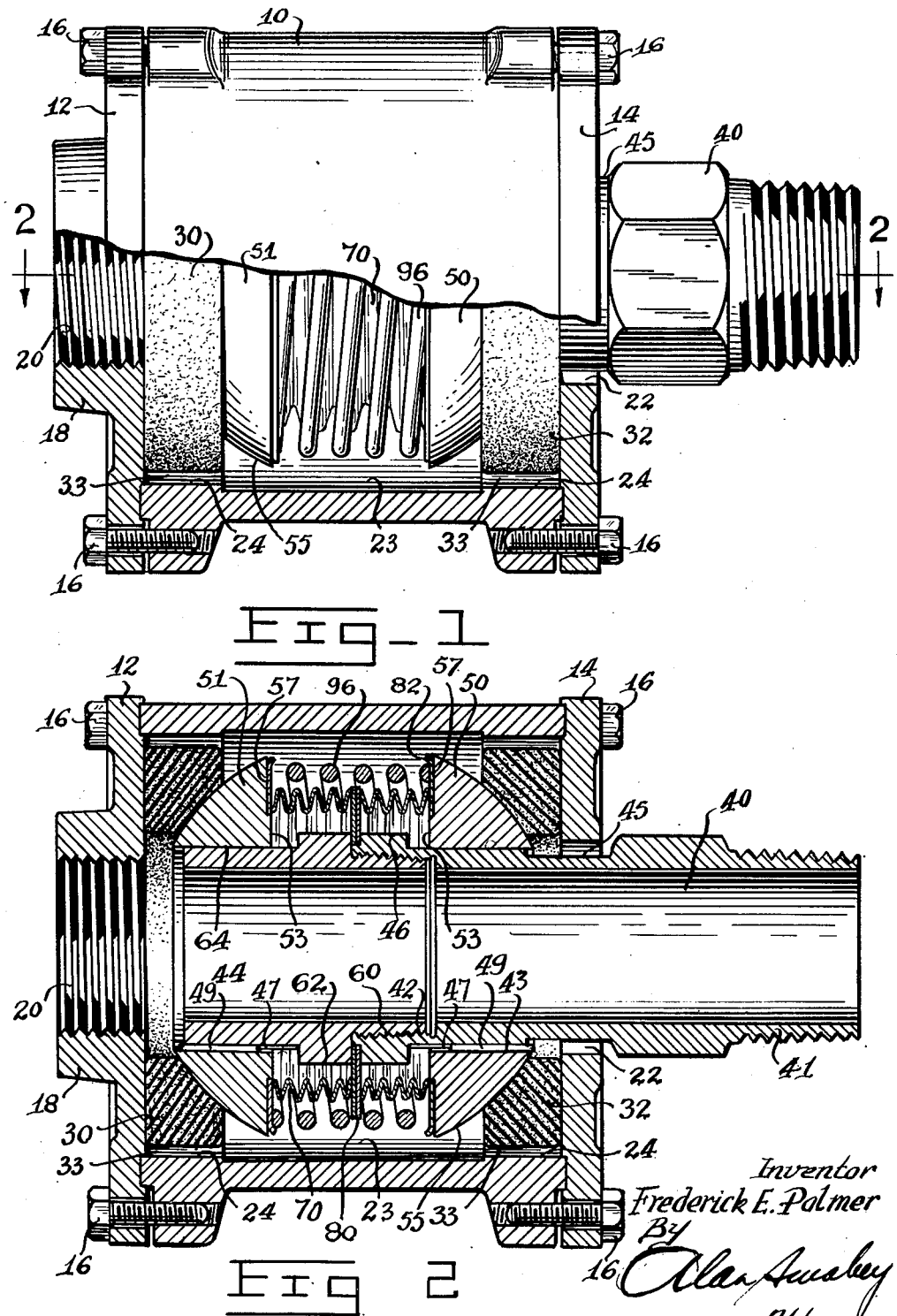
Inventor
Frederick E. Palmer
By
Alan Ausuley
Attorney Patented Mar. 10, 1953

2,631,048

UNITED STATES PATENT OFFICE 2,631,048

ROTARY JOINT

Frederick E. Palmer, Westmount, Quebec, Canada

Application April 15, 1949, Serial No. 87,675

2 Claims. (Cl. 285—94)

Introduction

The present invention relates to coupling or pressure joints, and more particularly to improvements in joints of this nature that are designed to be used in connection with the admission and exhaust of fluids from drums or cylinders that are rotated.

Rotary pressure joints utilized in this manner are subjected to considerable strains and stresses due to the movements of the drums or cylinders to where they are connected, and it is of prime importance that a connection of this type be designed to maintain alignment without undue strain or distortion that may cause the joint to leak or otherwise fail in service.

The present invention aims to provide a joint of this nature that is adapted to be fully flexible in all directions and moreover includes a means whereby possible leakage is eliminated by an internal pressure loss compensating arrangement that is actuated automatically by the pressure of fluid conveyed by the joint.

Applicant's development

The invention is a rotary joint that comprises of an outer casing adapted to be connected to a source of fluid under pressure, and an inner assembly adapted for connection to a prime rotary member, that is mounted within the outer casing so as to be rotatable and capable of flexible movement in all directions. Sealing means are provided between the outer casing and inner assembly that are adapted to maintain a pressure seal between the respective members and diaphragmatic and resilient means are provided that are adapted by pressure of fluid conveyed by the joint to exert pressure loss compensating action automatically on the sealing means.

More specifically, a preferred construction of the rotary joint according to the invention consists of a cylindrical outer body or casing that is capped at either end. One of the end caps include an opening through which the inner assembly protrudes for connection to a prime rotary member, and the other cap is formed to provide an inlet port. A pair of annular sealing and bearing rings, preferably of graphite, having concave inner faces are mounted within the cylindrical body adjacent each end cap so as to provide bearing and sealing members for the rotatably mounted inner assembly. In the preferred construction the annular sealing rings are of a smaller outside diameter than the inside diameter of the casing body so that an annular space is provided between the ring and the casing allowing the annular rings to move laterally within the body proper.

The inner assembly of the joint comprises essentially of a pipe sleeve having an insert extension threadably engaged at one end. The other end of the pipe sleeve protrudes beyond the outer casing and is suitably threaded for engagement with the prime rotary member. A pair of bellows diaphragms, preferably of metal are mounted on the pipe sleeve and insert, each of the diaphragms including an inwardly extending annular flange at one end and an outwardly extending annular flange at the other end and being mounted so that the inwardly extending flanges on the adjacent diaphragms meet in abutment and are retained between the adjacent faces of the pipe sleeve and insert. Both the pipe sleeve and the insert include outstanding annular collars adjacent their mating ends and on bearing surfaces provided behind the collars there are mounted a pair of free sliding seal rings, one on each member.

Each of these sealing rings are of a substantially hemispherical shape and they are mounted on the pipe sleeve and insert so that the convex sides face outwards with the flat sides meeting the outwardly extending flanges of the bellows diaphragms. Preferably the opposing flat faces of the sealing rings including annular recesses to provide a seat for the flanges of the diaphragms and a coil spring is mounted on the diaphragms between these outstanding flanges so that they are maintained in sealing contact by the compression of the spring. The hemispherical sealing rings are mounted on the pipe sleeve and insert so that they are free to slide horizontally in either direction along the bearing surfaces of these members and when the inner assembly is mounted within the outer casing the convex faces of these rings meet with the concave faces of the annular sealing rings at each end of the casing so that the entire inner assembly is mounted for free rotary and flexible motion in the manner of a ball and socket joint.

In use, initial sealing pressure is obtained by the action of the coil spring and diaphragm and by the cooperating action of the sliding seal rings and diaphragmatic means, additional self compensating sealing pressure is provided by the pressure of fluid conveyed.

Detailed description

Having thus generally described the nature of the invention particular reference will be made to the accompanying drawings, and in which:

Figure 1 is a side elevation partially in section of the preferred form of rotary joint constructed according to the invention.

Figure 2 is a sectional view of Figure 1 along the lines 2—2.

With reference to the drawings illustrating a preferred construction of rotary joint according to the invention, 10 designates the main outer body of the joint having cap ends 12 and 14 which are secured in place by suitable bolts 16.

One of the cap ends 12 is formed so as to have an annular collar 18 projecting from its outer surface and the collar 18 is bored and tapped so as to provide a threaded inlet port 20. The other cap end 14 comprises of a substantially flat plate that is bored centrally to provide an opening 22 through which the inner assembly of the joint protrudes for connection to a prime rotary member. The main body 10 is of a cylindrical form and is shaped interiorly so as to provide a main chamber 23 in which the inner assembly moves and a pair of annular projections 24 that extend inwardly from the main chamber 23 adjacent each end. A pair of annular sealing rings 30, 32, are mounted within the chamber 23 and are positioned adjacent each end in register with the projecting portions. Preferably the rings 30, 32 are of graphite composition so as to be self-lubricating, and are slightly smaller in outside diameter than the inside diameter of the collars 24 so as to provide an annular space 33 in which the rings 30, 32, can move in a lateral direction.

The inner assembly of the joint includes a pipe sleeve 40 having a tapped end 42 in which is threadably engaged an insert extension 44. The other end 41 of the pipe sleeve 40 extends beyond the cap end 14 and is preferably formed so as to provide a hexagonal surface adapted to be engaged by a tool for connecting purposes and is also suitably threaded for connection to a prime rotary member. The end 42 of the pipe sleeve 40 also includes an outwardly extending annular collar 46 that is adapted to meet with a corresponding annular collar 62 formed on the insert extension 44 when the respective members are joined. The main body of the pipe sleeve 40 between the ends 41, 42, is formed to provide a bearing surface 43, and a sealing ring 50 is mounted on this surface so as to be rotable with the pipe sleeve but free for lateral movement in the axial direction of the sleeve. Preferably, this is accomplished by keying the sealing ring 50 to the sleeve 40. A key 49 is driven into a key slot 47 extending substantially the length of the sleeve bearing surface 43 and the sealing ring 50 is slotted so as to move freely along the key 49. An annular groove 45 is also formed in the sleeve 40 so as to provide additional clearance between the sleeve 40 and the opening 22 in the cap 14 to give the inner assembly sufficient play for flexible movement. The insert extension 44 includes a threaded end 60 adapted to engage with the end 42 of the sleeve 40, and adjacent the annular collar 62 is formed to provide a bearing surface 64 on which a second sealing ring 51 is slidably mounted in the same manner as the ring 50 mounted on the sleeve 40.

A pair of tubular bellows diaphragms 70 that each include inwardly extending annular flanges 80, and outwardly extending annular flanges 82 are mounted on the pipe sleeve 40 and insert extension 44 prior to their assembly, and are positioned so that the flanges 80 are retained between the collars 46, 62 on the respective members to form a complete diaphragm unit that is partitioned centrally. This diaphragm unit is positioned substantially central of the chamber 23 in the outer body 10 and is located between the opposed faces of the sealing rings 50 and 51 so that the inward movement of the sealing rings 50, 51, and consequently the bellows diaphragms 70 are restricted by the outer faces of the annular collars 46, 62 on the respective sleeve members.

The sealing rings 50, 51 are preferably made of self-lubricating bronze and are of a substantially hemispherical form having inner flat surfaces 53 and outer convex faces 55. The inner flat surfaces 53 include annular recesses 57 so as to provide a seating means for the outwardly extending flanges 82 of the diaphragms 70 and a coil spring 96 is mounted exteriorly of the diaphragms and between the opposed diaphragm flanges 82 so as to maintain the flanges 82 in sealing contact with the sealing rings 50, 51.

In use, the inner assembly rotates with the prime rotary member to which the pipe sleeve end 41 is connected, for example, a dryer roll, drum, or other similar apparatus to which it is necessary to convey fluid while the apparatus is rotating. The fluid, for example, steam, passes through the entry port 20, through the extension 44 and through the pipe sleve 40 into the rotary member. Initial sealing pressure is obtained by means of the coil spring 96 acting against the diaphragms 70, but the joint also automatically utilizes the pressure of the steam to provide additional self-compensating sealing pressure in the following manner.

Due to the close bearing or sealing fit between the first sealing ring 30, and the sealing ring 51, any pressure leakage first takes place between the inner surface of the sealing ring 51 and the bearing surface 64 of the insert extension 44, this latter fit being designed expressly for this purpose. Hence pressure is brought to bear on the inner surface of the first half of the bellows diaphragm 70, and due to the effective hydraulic area of this portion of the diaphragm 70 being larger than the exposed area of the convex surface of the sealing ring 51 against which the pressure of the conveyed steam is exerted, greater pressure is brought to bear against the back of the sealing ring 51, thereby maintaining a constant sealing contact between the first sealing ring 30 and the sealing ring 51.

Should leakage occur between the first sealing ring 30 and the sealing ring 51 due to the presence of dirt or foreign matter between the sealing rings, the steam would then pass into the chamber 23 to exert pressure on the external surface of the second portion of the bellows diaphragm 70, thereby exerting additional pressure on the sealing ring 50 to assure a constant contact bearing or sealing between the sealing ring 50 and the second sealing ring 32.

The bellows diaphragms 70 themselves also act as a seal from one section of the inner assembly to the other, and to atmosphere. Use of the bellows diaphragms 70 employs the well known principle of increasing pressure on a body by means of employing a force of larger hydraulic area. Use of the pressure of the medium being conveyed through the joint to provide this force, makes the operation automatic and self-compensating to the work demand.

A main feature of the rotary joint constructed according to the present invention is that full flexibility is provided with constant sealing maintained. The full free-floating feature eliminates the binding action common to other joints, as under any action of misalignment, longitudinally, angularly, and laterally both sealing rings are free to maintain their proper arc of contact one within the other.

This form of construction provides a distinct advantage over the prior joints of this nature that have their non-rotating sealing rings fixed in a lateral plane and have one or both of the rotatable sealing rings immovably attached to the rotatable inner assembly. The flexibility in a joint constructed in this manner is necessarily limited by the amount of flexibility in their supporting or mounting means, and with the stationary sealing rings being incapable of lateral motion, any misalignment alters the point of contact between the sealing rings of the inner assembly and the fixed sealing rings, and may cause breakage or extreme wear. Further, when the rotatable sealing rings are immovably secured to the rotatable inner assembly, longitudinal deflection either places extra pressure on the sealing rings or forces the contacting sealing rings apart, thus breaking the seal of the joint.

In the present joint the novel use of bellows diaphragms with free-moving inner sealing rings as a ball and socket assembly provides a means of taking up all movements which tend to disrupt the seals, and at the same time automatically adjusts the sealing pressure where needed.

I claim:

1. A rotary joint adapted to provide a flexible connection between a stationary pipe fitting and a rotary member, comprising the combination of a cylindrical casing, capped at both ends with one of said end caps including an inlet opening adapted for connection to said stationary fitting and the other end cap including a centrally disposed opening; and a pressure sealed fluid conducting inner assembly mounted for floating rotation within said casing, said inner fluid conducting assembly including a pipe sleeve having an inter-connected pipe sleeve extension, a pair of annular bearing and sealing rings mounted within said casing adjacent said end caps and being of lesser external diameter than the interior diameter of said casing adapting said sealing rings for a limited transaxial movement relative to said pipe sleeve and extension, a pair of spaced apart substantially hemispherical sealing rings one of which is slidably mounted for limited axial movement on said pipe sleeve and the other for limited axial movement on said extension and being journalled in said annular bearing rings, a pair of inter-connected bellows diaphragms mounted over and being secured at their mating inner ends between said pipe sleeve and extension between said hemispherical sealing rings with the outer ends of said diaphragms engaged in sealing contact therewith, and a coil spring mounted over said diaphragms adapted to urge and maintain said hemispherical sealing rings, annular bearing rings and diaphragms into sealing contact, whereby the entire inner fluid conducting assembly is mounted for rotary and flexible movement relative to said casing in the manner of a ball and socket joint.

2. A rotary joint as claimed in claim 1, wherein the inner mating ends of each of the opposed bellows diaphragms includes an inwardly extending annular flange engaged with and retained between the mating faces of said pipe sleeve and said interconnected sleeve extension, the outer ends of said bellows diaphragms each having an outwardly extending annular flange in sealing contact with the inner opposed surfaces of said hemispherical sealing rings.

FREDERICK E. PALMER.

REFERENCES CITED

The following references are of record in the file of this patent:

UNITED STATES PATENTS

| Number | Name | Date |
| --- | --- | --- |
| 871,757 | Greenlaw | Nov. 19, 1907 |
| 1,164,040 | Walton | Dec. 4, 1915 |
| 1,826,212 | Gremminger | Oct. 6, 1931 |
| 1,827,432 | Hundemer | Oct. 13, 1931 |
| 2,114,489 | Grisell | Apr. 19, 1938 |
| 2,303,642 | Hoy | Dec. 1, 1942 |
| 2,352,317 | Goff et al. | June 27 1944 |